UNITED STATES PATENT OFFICE.

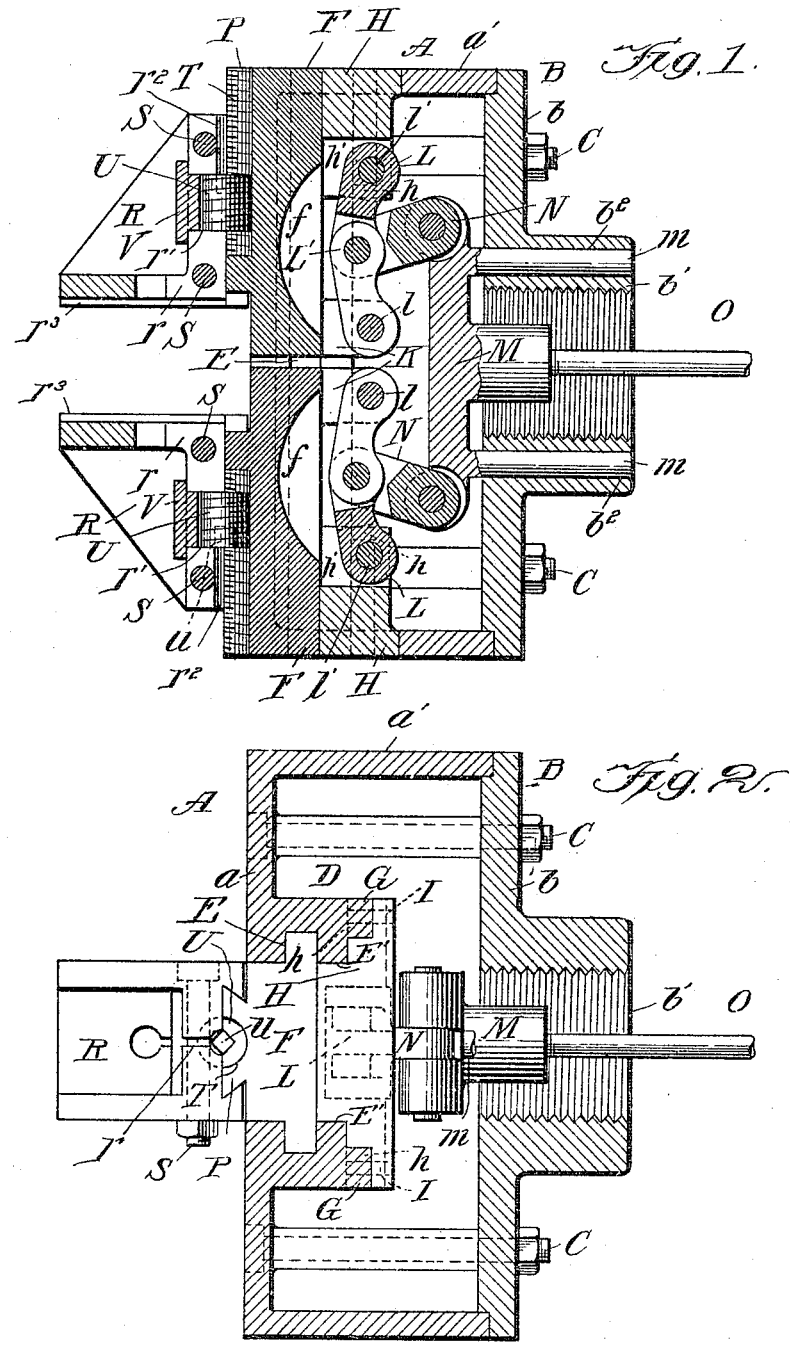

PAUL J. GREBEL, OF CHICAGO, ILLINOIS.

CHUCK.

959,515.  Specification of Letters Patent.  Patented May 31, 1910.

Application filed May 17, 1909. Serial No. 496,577.

*To all whom it may concern:*

Be it known that I, PAUL J. GREBEL, a citizen of the United States, residing at Chicago, county of Cook, State of Illinois, have invented a certain new and useful Improvement in Chucks, and declare the following to be a full, clear, and exact description of the same, such as will enable others skilled in the art to which it pertains to make and use the same, reference being had to the accompanying drawings, which form a part of this specification.

My invention has for its object to provide a flexible, powerful chuck of simple and durable construction.

The various features of novelty whereby my invention is characterized will hereinafter be pointed out with particularity in the claims; but, for a full understanding of my invention and of its object and advantages, reference may be had to the following detailed description taken in connection with the accompanying drawing, wherein:

Figure 1 is a central section of my improved chuck; and Fig. 2 is a view looking down on Fig. 1, the casing being shown in section and the remaining parts in plan.

Referring to the drawing, A and B represent the two parts of a casing or housing, preferably cylindrical in form.

The member A comprises a disk-like portion $a$ and an annular flange $a^1$ extending rearwardly from the outer edge thereof. The member B consists of a disk-like member $b$ having an internally screw-threaded hub $b^1$ for securing the chuck upon the spindle of a machine. The two members of the casing or housing may be secured together in any suitable way, as by means of bolts C. Arranged on the inner face of the disk $a$, so as to be inclosed within the casing, is an elongated boss D. The disk $a$ and the boss D are slotted so as to form a T-slot E opening through the face of the chuck.

F—F are movable members slidably arranged within said slot, each of these members being preferably slightly less than one-half the diameter of the chuck. The members F may themselves constitute the jaws of the chuck, or they may serve as supporting members for the actual jaws. Since, as will hereinafter appear, the movement of the members F is very limited, these members are preferably made to carry adjustable jaws for clamping the work, in order that the chuck may receive and hold work varying widely in size.

Near the outer ends of the boss D are projections G, there being two of these projections at each end of the boss.

H—H are blocks which fit between the members G—G at each end of the boss and within an auxiliary or branch slot $E^1$ opening rearwardly from the T-slot E. Each of these blocks is provided with laterally-projecting flanges $h$ which are adapted to underlie the projections G and be secured thereto in any suitable manner, as by means of screws I. The cylindrical wall $a^1$ of the casing is preferably cut away at each end of the boss D so as to be capable of receiving both the jaw members F and the outer ends of the blocks H. In assembling the parts, the jaw members may be inserted radially from the outside and the blocks may then be introduced from the inside. Each of the jaw members is provided at its inner end with ears K and, extending between each pair of ears and the corresponding block H, is a toggle L, one end of which is secured to the ears by means of a pin $l$ and the other end of which is secured within a slot $h^1$ of the block by means of a pin $l^1$.

It will be seen that by operating the toggles the jaw members may be moved from and toward each other. In order to operate the toggles, I provide a spider M which is connected to the hinges $L^1$ of the toggle by means of links N.

O is an operating rod extending from the spider through the rear of the chuck, and any suitable means may be provided for actuating this rod so as to open and close the chuck. In order to hold the spider centrally, I provide it with a pair of pins $m$ which slide within openings $b^2$ in the hub $b^1$, although any other suitable centering means may, of course, be employed.

I prefer to arrange the parts so that when the members F—F are nearest to each other, the toggles are almost, but not quite, straightened, thereby permitting a very powerful leverage to be exerted at the time the chuck is closed, without making the toggles act as rigid struts to lock the jaws in closed positions. Consequently, a continuous pull may be maintained upon the rod O while the chuck is in operation and, if the work should tend to become loose in the chuck the slack would be automatically taken up. While this arrangement is of advantage regardless of the actuating means employed, it is of peculiar advantage where the actuating means is pneumatic pressure such as is now commonly employed, for in this case the pneumatic actuating means is always ready to close the jaws more tightly when occasion demands. In order to make the chuck as compact as possible, I prefer to cut away a portion $f$ on the back of each of the jaw members F so as to provide room within which the toggles may play. Moreover, this permits the pressure to be applied as near the face of the chuck as possible.

Projecting from the front face of each of the members F is an elongated dove-tail member P and slidably arranged upon each of these dove-tailed members is a jaw R of any suitable construction, although preferably constructed as illustrated. Each of the jaws is preferably provided with a slit $r$ extending radially therethrough so as to permit the jaws to be clamped positively in place upon the members F by means of bolts S extending through the jaws transversely of the slits. The auxiliary jaws may be adjusted by simply loosening the bolts S and sliding the jaws in or out as required; but, for convenience of adjustment, I have provided a screw-threaded device whereby each of the jaws may be accurately shifted in and out and held in position until the bolts are secured. To this end I have provided within the face of each of the dove-tailed members P a radially-extending, semi-cylindrical, screw-threaded opening T. Each of the jaws is provided with an opening $r^1$ extending therethrough parallel with the axis and in registration with the adjacent screw-threaded groove. The openings $r^1$ are of sufficient size to permit the insertion of nuts U constructed to coöperate with the screw-threads in the grooves. It will be seen that when the nuts are in position and are turned, the relative movement between the nuts and the screw-threads in the grooves results in moving the jaws R in or out as the case may be, since the ends of the nuts bear against the walls of the openings within which the nuts are housed. In order that the nuts may be actuated, they are provided with square openings $u$ in their upper ends and the jaws R are cut away as at $r^2$, in order to permit the insertion of a wrench. After the nuts have been placed in position they are locked in place by means of caps V. Where there are only two jaws, as illustrated, their adjacent faces may be grooved as at $r^3$ so as to center the work transversely.

It will now be seen that I have provided a simple and compact chuck in which work of varying sizes may be held rigidly by means of jaws which, of themselves, have but small opening and closing movements. Furthermore, I have provided a chuck in which the work may be held under a continuous-yielding pressure so that any slight loosening tendency is immediately overcome and the work is held firmly under all conditions.

While I have described in detail only a single form of my invention, I do not desire to be limited to the specific structural details thus described, but intend covering all forms of my invention which fall within the terms of the definitions thereof constituting the appended claims.

What I claim is:

1. In a chuck, a housing, a plurality of radially-movable jaws slidably mounted in said housing, a plurality of toggles within said housing, each toggle having one end connected to said housing and the other end connected to one of the jaws, an axially-movable spider lying in rear of the toggles and projecting radially into proximity to the knuckles of the toggles, and links connecting said spider to the knuckles of the toggles.

2. In a chuck, a housing, a plurality of radially-movable jaws slidably mounted in said housing, a spider positioned within the housing in rear of the jaws, a plurality of toggles lying within said housing and between said spider and said jaws, each of said toggles being connected at one end to said housing and at its other end to the inner end of one of the jaws, and a link connecting said spider with each of said toggles, and means for actuating said spider.

3. In a chuck, a supporting member, a plurality of radially-movable jaws slidably mounted on said member, an axially-movable spider positioned in rear of said jaws, toggles lying between said spider and said jaws, each toggle lying in rear of one of the jaws and having its inner end connected to the inner end of the jaw behind which it lies and its outer end connected to said member, and links connecting said spider to the knuckles of the toggles.

4. In a chuck, a housing, a plurality of radially-movable jaws slidably mounted in said housing, a plurality of pins slidably connecting said spider to the housing so as to permit relative axial movement between the spider and the housing; toggles lying between the spider and jaws, each of said toggles having its inner end connected to the inner end of one of said jaws and its outer end connected to the housing, and links connecting the knuckles of said toggles to said spider.

5. In a chuck, a box-like housing, radially-movable jaws slidably mounted in one face of said housing, radially-removable blocks secured to said housing at the periphery thereof and in rear of said jaws, a spider in said housing in rear of said jaws, toggles lying between said spider and said jaws, each of said toggles being connected at one end to one of said blocks and at its other end to one of said jaws, and connections between said spider and knuckles of said toggles.

6. In combination, a main jaw, an auxiliary jaw, one of said jaws having a dovetail groove and the other of said jaws having an elongated dovetail projection fitting in said groove, one of said members having a semi-cylindrical screw-threaded groove extending lengthwise of and in the dovetail portion thereof, the other member having a pocket lying opposite said screw-threaded groove, and a cylindrical screw-threaded piece lying in said pocket and meshing with the threads in said screw-threaded groove, said pocket being constructed and arranged to hold said screw-threaded piece against axial movement therein while permitting it to be rotated.

In testimony whereof, I sign this specification in the presence of two witnesses.

PAUL J. GREBEL.

Witnesses:
WM. F. FREUDENREICH,
H. S. GAITHER.